United States Patent Office 3,480,622
Patented Nov. 25, 1969

3,480,622
PROCESS FOR THE PREPARATION OF DEBROMINATED ANALOGUES OF BROMO-STEROIDS OF THE PREGNANE, ANDROSTANE AND CHOLESTANE SERIES
Derek Harold Richard Barton, London, England, assignor to Research Institute for Medicine and Chemistry, Inc., Cambridge, Mass., a corporation of Massachusetts
No Drawing. Continuation-in-part of application Ser. No. 418,903, Dec. 17, 1964. This application May 8, 1967, Ser. No. 636,636
Claims priority, application Great Britain, Jan. 21, 1964, 2,631/64
Int. Cl. C07c 167/00
U.S. Cl. 260—239.55                                   18 Claims

ABSTRACT OF THE DISCLOSURE

A process for the preparation of a debrominated analogue of a bromo-steroid without attack on a normally readily eliminatable substituent carried by a carbon atom adjacent to the carbon atom carrying the bromo-substituent by reacting the bromo-steroid with a salt of a polyvalent metal in which the metal is in a lower state of valence capable of oxidation to a higher state in the presence of a substance capable of providing hydrogen free radicals.

This application is a continuation-in-part of my copending application S.N. 418,903 filed on Dec. 17, 1964 and now abandoned.

This invention concerns a novel process for the reductive dehalogenation of organic halides, especially halogen-substituted steroids.

In the chemical synthesis of organic compounds it is frequently necessary to remove halogen from an organic halide without unwanted attack at other points in the molecule. Thus, for example, in previous attempts to dehalogenate halohydrins reductively, it has been found that the hydroxyl group was eliminated to give an unsaturated product. This problem is especially frequent in the synthesis of complex carbocyclic structures such as the steroids and alkaloids where there are commonly a number of other groupings such as keto, acetyloxy, hydroxy, alkoxy, carboxy, etc. groups present and it is undesirable that these should be attacked.

We have now found that organic chlorides, bromides, and iodides wherein the halogen atom is attached to a primary, secondary or tertiary carbon atom can readily be converted into their dechlorinated, debrominated or deiodinated analogues by reduction with a low-valency metal ion or dissolving metal reducing agent in the presence of a transfer donor of hydrogen radicals. Our new process in general gives comparatively good yields and the selectivity is good.

By the term "low valency metal ion reducing agent" as used herein is meant reducing agents or systems supplying metal ions in a low valency state which are capable of ready oxidation to a higher valency state and hence exhibit reducing properties. Such reducing agents, include, for example, ferrous, titanous, thallous, stannous, chromous salts, etc. By the term "dissolving metal reducing agents" is meant reducing systems comprising a metal and a liquid which dissolves the metal to form a compound thereof thereby increasing the valency of the metal and leading to reduction of other substances present. Such reducing systems include, for example, zinc and acid, zinc amalgam or aluminum amalgam and water etc.

According to the present invention therefore we provide a process for the production of dechlorinated, debrominated or deiodinated analogues or organic halides wherein an organic halide having one or more chlorine, bromine or iodine atoms attached to a primary, secondary or tertiary carbon atom is reacted with a substance selected from the group consisting of dissolving metals and low-valency metal salts as reducing agent in the presence of a transfer donor of hydrogen radicals to replace said chlorine, bromine or iodine atom by a hydrogen atom.

The reducing agent is preferably a chromous salt of an organic carboxylic acid, preferably of a lower ($C_{1-6}$) alkanoic acid such as butyric, propionic or, preferably, acetic acid which may however, carry substituents e.g. halogen atoms. Chromous acetate is especially suitable. Other reducing agents of this type include other chromous salts, titanous salts, thallous salts, zinc in acid etc.

It should be noted that while chlorine, bromine and iodine atoms may be replaced by hydrogen in the process of the invention, fluorine atoms normally remain unaffected.

The reaction is of particular interest in the field of steroid synthesis and has proved especially useful in the dehalogenation of chloro-, bromo and iodo-steroids carrying a monovalent oxygen function on a carbon atom adjacent to that adjacent to the carbon to which the halogen to be removed is attached. The reaction normally proceeds readily with elimination of the adjacent oxygen function and similarly, an adjacent fluorine atom is also normally eliminated. The acyloxy group may, for example, be a lower aliphatic acyl group, e.g. having 1-6 carbon atoms. Using the method according to the invention, $9\alpha$-bromo-$11\beta$-hydroxy steroids, $9\alpha$-bromo-$11\beta$-fluoro steroids, $16\beta$-bromo-$17\alpha$-hydroxy steroids, $5\alpha$-bromo-$6\beta$-hydroxy steroids and $5\alpha$-bromo-$6\beta$-fluoro steroids have all been reduced on to produce their de-brominated analogues.

By the term "steroids" we mean compounds having the basic cyclopentanoperhydrophenanthrene ring structure and which may contain various substituents and/or double bonds e.g. a keto, hydroxy or acyloxy group in the 3-position, alkyl groups in the 2-, 6- and 16-positions, keto, or acetyloxy groups at the 20-position, a keto, acyloxy, hydroxy or hydrocarbon group at the 17-position, a hydroxy group, an acyloxy group or a fluorine atom at the 11- or 6-position, a hydroxy group at the 12-position, a double bond in the 1 and/or 4-position and/or a fluorine atom in the 11- or 6-position.

One especially interesting class of steroids which may advantageously be subjected to the process of the invention are the $11\beta$-hydroxy-$\Delta^4$-3-keto-steroids having a chlorine, bromine or iodine atom in the $9\alpha$-position. $\Delta^4$-3-keto-steroids having an oxygen function at the 11-position are common among the physiologically active steroids, for example, cortisone, hydrocortisone, prednisone, prednisolone, 16-methyl prednisolone, $11\beta$-hydroxy progesterone, etc. In the synthesis of these compounds, it is commonly economically advantageous to start from more readily available steroids which are unsubstituted at the 11-position and to introduce subsequently the desired oxygen function. Many of the methods previously proposed for the introduction of an 11-oxygen function into the steroid molecule have been particularly elaborate and required a large number of stages.

It has been found to be difficult to use reactions which take place selectively at the 11-position and other functions in the molecule have usually had to be protected previously and the protecting groups removed subsequently. In particular, it has previously been found difficult to introduce an 11-hydroxy substituent in the $\beta$-configuration and methods for converting the more readily available 11α-hydroxy steroids have also been cumbersome.

The process of the invention enables the 9α-chloro-, bromo- and iodo-11β-hydroxy-Δ⁴-3-keto-steroids to be readily converted to their analogues possessing hydrogen at the 9α-position without substantial elimination of the 11β-hydroxyl group.

The process of the invention also allows 6β-hydroxy steroids unsubstituted at the 5α-position to be prepared from the readily available 5α,6β-halohydrins. Such 6β-hydroxy compounds are of use, for example, as intermediates in the production of 19-nor or 19-hydroxy-steroids.

The dehalogenation of the above 9α-halogeno-11β-hydroxy steriods is found to tend to yield other compounds to a relatively small extent. Thus, for example, besides the desired product, the corresponding 9(11)-dehydro-steroid is formed by elimination of both halogen and hydroxyl as well as a further 11β-hydroxy compound which is a 5,9-cyclo compound. These products may be represented by the partial structures

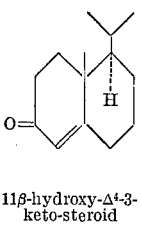 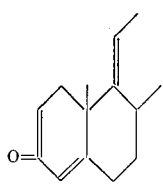 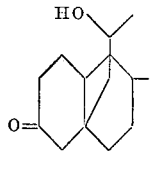

11β-hydroxy-Δ⁴-3-keto-steroid    9(11)-dehydro-Δ⁴-3-keto-steroid    11β-hydroxy-5,9-cyclo-3-keto-steroid It is found that different reaction conditions tend to yield different proportions of these products and it is not difficult to select conditions which favor the production of the desired product at the expense of the other two substances.

The reaction according to the invention is also especially useful in allowing the preparation of 11β-fluoro and 6β-fluoro compounds having hydrogen at the 9α and 5α positions. Such steroids are new compounds and in general possess enhanced biological activity as compared to their non-fluoro analogues. According to a further feature of the invention, therefore, we provide 9α-unsubstituted 11β-fluoro-steroids and 5α-unsubstituted 6β-fluoro steroids.

As indicated above, the hydrogen atom replacing the chlorine, bromine or iodine atom will be furnished by a substance present in the reaction mixture which provides hydrogen free radicals. Whilst it is not wished to be bound by theoretical considerations, it is thought that the reaction proceeds by a preliminary transfer in which the halogen is eliminated, the reducing metal or metal ion being increased in valency to supply the necessary electron, and a free radical being generated at the position originally occupied by the eliminated halogen atom. Hydrogen is then supplied by hydrogen atom transfer from an appropriate substance present in the reaction mixture. Such substances include, for example, $H_3PO_2$, hydrides, such as triarylsilanes or triaryltinhydrides, 1,4-dihydroaromatic compounds such as 1,4-dihydrobenzene and 1-benzyl-1,4-dihydronicotinamide, and related dienes such as cyclopentadiene, etc., and in particular, thiols. Thiols, which can be represented by the general formula R.SH, undergo hydrogen atom transfer especially readily and we have found that in the reductive dehalogenation reaction of the invention, thiols greatly increase the yield of the desired dehalogenated analogues being themselves largely converted to disulphides RSSR. This last finding is suggestive of the free radical mechanism which is postulated, since the conversion of R.SH to disulphide normally requires oxidising conditions.

The group R in the thiol may, for example, be an aliphatic, araliphatic or aromatic group which may if desired carry substituents such as hydroxy, ether, thioether, keto, carboxyl, esterified carboxyl groups etc. Unsubstituted hydrocarbon groups are, however, preferred, for example lower alkyl groups or unsubstituted aryl groups such as phenyl groups.

In the steroid series the starting compound may carry substituents at, for example, the 3, 6, 11, 16, 17 positions etc. or may be unsaturated, for example at C 1(2) or 4(5). Substituents which may be present include, for example, hydroxy, keto, methylene-dioxy, acyl, alkyl, alkynyl groups etc. and fluorine atoms and in particular the groupings at C 17 may be one of the groupings giving physiological activity, for example keto, acetyl, β-acetyl-α-hydroxy, etc. Reactive groups such as keto groups can, if desired, be protected e.g. by conversion to ketal-groups. The 6 and/or 16 positions can advantageously carry alkyl groups, such as methyl groups, in the α- or β-configuration. The halogen atoms to be removed may, for example, be in the 9α, 5α- or 16β-position.

The reducing agent is preferably present in at least stoichiometric quantities with respect to the steroid and is advantageously in excess. 1 to 10 mols of reducing agent may, for example, be used, preferably about 5 mols.

The reaction is advantageously carried out in an inert solvent and this is preferably polar. The principal consideration in choosing a solvent is the solubility of the steroid starting compound. Thus, for example, the solvent may be an alcohol, ketone, cyclic ether or substituted amide or sulphone solvent, for example, methanol, ethanol, acetone, methyl ethyl ketone, dioxan, tetrahydrofuran, dimethylformamide (DMF), dimethylacetamide (DMA), dimethylsulphoxide (DMS) etc. Aprotic solvents such as DMA, DMF and DMS are preferred.

The reaction temperature does not appear to be critical and may lie between the freezing and boiling points of the reaction medium e.g. between about −50° and 100° C. Conveniently, however, the reaction temperature is about ambient.

Where the reducing agent is a chromous salt of a carboxylic acid, this may conveniently be prepared by reacting chromous chloride with a salt of such an acid e.g. an alkali metal acetate, preferably in an inert atmosphere to avoid oxidation and preferably in water or ethanol as solvent. The chromous salt of the organic acid is normally precipitated and may then be separated from the reaction mixture and, preferably, dried. Chromous chloride is conveniently prepared by reduction of chromic chloride with amalgamated zinc dust.

In order that the invention may be well understood, the following examples are given by way of illustration only:

M.P.'s taken on a Kofler-type hot stage, are uncorrected. Unless stated otherwise, ultraviolet spectra were determined in methanol and optical rotation in chloroform. Infrared spectra were determined using an Infracord model 137 spectrophotometer.

EXAMPLE I

Chromous chloride

Amalgamated zinc dust was prepared by mixing together zinc dust (30 g.), mercuric chloride (1.2 g.), water (30 ml.), and concentrated hydrochloric acid (6 ml.) for 10 minutes and decanting the supernatant liquid. A solution of chromic chloride hexahydrate (25 g.) is freshly-boiled, deionized water (100 ml.) and concentrated hydrochloric acid (6 ml.) was added with swirling to the above amalgamated zinc dust in an atmosphere of carbon dioxide. Reduction (which takes about 2.5 hours) was allowed to continue in this inert atmosphere.

Chromous acetate

The bright-blue-coloured solution of chromous chloride was added (care should be taken to avoid access to air at this stage) with swirling to a solution of sodium acetate crystals (50 g.) in deaerated and deionized water (100 ml.) kept under carbon dioxide, whereupon red chromous acetate precipitated rapidly. For filtration, the following apparatus was found to be very convenient: The slurry of chromous acetate was quickly transferred to a sintered glass filter which was provided with an airtight rubber stopper. The stopper was fitted with carbon dioxide inlet and outlet tubes and a dropping funnel. During the transfer, filtration, washing, and drying of the chromous acetate, dry carbon dioxide was passed through the filter. By careful regulation of the carbon dioxide rate, a slight suction may be applied to filter. The product was washed several times with small portions of deaerated and deionized water until the washings were free of chloride ions, as tested with silver nitrate solution. Drying was carried out by washing it with a little absolute ethanol (preferably distilled in a nitrogen atmosphere) and then with ether, the last traces of ether being removed be the stream of dry carbon dioxide (3 hours).

The brick-red chromous acetate powder must be completely dry in order to produce a reasonably stable product before exposure to air, as it is oxidized very rapidly when wet. The purity (determined titrimetrically) of the freshly-prepared material varies from 75 to 85 percent. The yield was 12 g. or 75.5 percent of the theoretical based on chromic chloride hexahydrate. Its strength deteriorates in a few days even when kept in a desiccator previously filled with carbon dioxide.

9α-bromo-11β-hydroxy steroids in dimethylsulphoxide were debrominated on treatment with chromous acetate and n-butanethiol. The yield of the debromo compound varies from 75 to 80 percent. A typical experiment is described below.

Reductive dehalogenation of 9α-bromo-11β-hydroxy-progesterone

To a stirred solution of 9α-bromo-11β-hydroxy-progesterone (0.5 g.), n-butanethiol (1 ml., ca. 7.5 mole equivalents) in dimethyl sulphoxide (40 ml. Matheson, Coleman and Bell; not further purified) was added chromous acetate (1.35 g., 74% 5 mole equivalents) at room temperature and in an atmosphere of carbon dioxide. Stirring was continued overnight. Carbon dioxide was allowed to pass for ca. 10 hours. The reaction mixture was then poured into ice water and extracted with methylene chloride. The extract was washed with water and dried over anhydrous sodium sulphate. Evaporation of the solvent in vacuo gave crude crystalline 11β-hydroxy-progesterone, which on treatment with ethyl acetate (small volume) gave prisms (0.3 g., 75%), M.P. 182–185° (lit.[6] M.P. 186–188°). Chromatography of the concentrated mother liquor on acid-washed alumina (3.5 g.) and elution with methylene chloride containing 0.4% methanol yielded a further amount of the compound (24 mg.), M.P. 165–180°. The total yield was 0.324 g. (80.4%).

EXAMPLE 2

Example 1 was repeated using various solvents The results are set out in Table I below:

TABLE I

| Solvent | n-Butyl mercaptan, moles | Δ⁹⁽¹¹⁾-progesterone, percent | 11β hydroxy-progesterone, percent | 5,9-cyclo, percent |
|---|---|---|---|---|
| THF (70 ml.) (anh.) | 5 | | 72 | |
| THF (70 ml.) (anh.) | 5 | | 72.5 | |
| Benzene (anh.)=100 ml | | (1) | (1) | |
| Benzene (anh.)=100 ml | 5 | (1) | (1) | |
| DMS (not distilled)=40 ml. | 10 | | 69 | |

[1] No reaction.

In a blank experiment in which 11β-hydroxy-progesterone was treated under identical conditions, the recovery of starting material was about 85%.

EXAMPLE 3

Example 2 was repeated using thiophenol (10 moles) in place of n-methyl mercaptan and DMS (940 ml.) as solvent. 11β-hydroxy-progesterone was obtained in 75% yield and diphenyl disulphide was also isolated (by chromatography).

The experiment was repeated using tetrahydrofuran as solvent, both in the light and in the dark and the results are shown in Table II below:

TABLE II

| Expt. | Dry THF, ml. | Steroid, mg. | Thiophenol, g. | Diphenyl disulphide | 11β-hydroxy-progesterone, percent |
|---|---|---|---|---|---|
| 1 (light) | 70 | 500 | 875 | 230 mg. (88% with respect to the steroid). | 37 |
| 2 (dark) | 70 | 500 | 875 | 113 mg. (43% with respect to the steroid). | 20 |

EXAMPLE 4

Example 1 was repeated using various thiols as hydrogen donors and the results are shown in Table III below:

TABLE III

| Expt. | DMS, ml. | Mercaptan | Yield (percent) of 11β-hydroxy-progesterone |
|---|---|---|---|
| 1 | 40 | n-Butylthiol (7.5 mole equiv.) | 80 |
| 2 | 30 | Ethanethiol (5 mole equiv.) | 67 |
| 3 | 40 | Methanethiol (ca. 30 mole equiv.) | 81 |

EXAMPLE 5

Example 1 was repeated using 9α-bromo-cortisol acetate and 7.5 mole equivalents of n-butylthiol giving a yield of 77% of cortisol.

EXAMPLE 6

Example 5 was repeated using 9α-bromo-cortisol bismethylene dioxide, giving a yield of 80% of cortisol bismethylene dioxide.

EXAMPLE 7

Chromous acetate reduction of 9α-bromo-11β-hydroxy progesterone in DMS (dimethylsulphoxide)

To a stirred solution of the bromohydrin (500 mg.) in DMS (40 ml.), containing thiophenol (1.3 g., 10 mole equivs.) was added chromous acetate (80%: 1.3 g., 5 mole equivalents) at room temperature in a carbon dioxide atmosphere. Stirring was continued overnight. Carbon dioxide was allowed to pass for 9 hours. The reaction mixture was poured into water and extracted with methylene dichloride. The extract was shaken with dil. sodium hydroxide solution (10%, 100 ml.) for 15 minutes, washed with water and dried. Chromatography of the product (ca. 1.4 g.) over alumina (35 g.) in methylene chloride containing increasing amounts of methanol gave (1) bisphenyl disulphide (1 g.) M.P. 59–61° and (2) 11β-hydroxy progesterone. Recrystallized from ethyl acetate this formed prisms (300 mgs., 74%), M.P. 180–188°, $[\alpha]_D^{25}$ +215.4° (c. 0.76 in acetone), $\lambda_{max}$ 242 mμ (ε 16,000), $\nu_{max}^{KBr}$ 3500 (s), 1700 (s), 1655 (vs), 1625 (m) cm.⁻¹ identical with an authentic specimen (mixed M.P., I.R. spectrum), [M.P. 186–188°, $[\alpha]_D^{20}$ +217° (acetone), $\lambda_{max}$ 242 mμ (log ε=4.26)].

EXAMPLE 8

17,20:20,21-bismethylenedioxy-cortisol

Under the conditions described for reduction of 9α-bromo-11β-hydroxy progesterone in Example 1, 17,20, 20,21-bismethylenedioxy-9α-bromocortisol (571 mg.) in DMS (60 ml.) containing n-butyl mercaptan (1.05 ml., 7.5 mole equivs.) was treated with chromous acetate (79%, 1.26 g., ca. 5 mole equivs.) to give the crude product, which on treatment with ethyl acetate gave 17,20; 20,21-bismethylenedioxycortisol as prisms (318 mg.), M.P. 229–237°, $[\alpha]_D^{25}$ +27.5° (c. 0.87), $\lambda_{max}$ 242 m$\mu$ ($\epsilon$ 15,600), $\nu_{max}^{KBr}$ 3600 (a), 1675 (vs), 1625 (m) cm.$^{-1}$ identical with an authenthic specimen (mixed M.P., I.R. spectrum), [M.P. 217–222°, $[\alpha]_D$ +26°]. The mother liquor on concentration and chromatography over alumina gave a further crop (69 mg.) M.P. 215–230°. The total yield was 387 mg. (81%).

EXAMPLE 9

Cortisol-21-acetate

9$\alpha$-bromocortisol 21-acetate (602 mg.) in DMS (35 ml.) containing n-butyl mercaptan (1 ml.) was treated as in the previous examples with chromous acetate (74%; 1.4 g., ca., 5 mole equivs.). Recrystallization of the crude product from methanol afforded cortisol-21-acetate (387 mg., 77%), M.P. 205–210°, +157.7° (c. 0.66), $\lambda_{max}$ 241 m$\mu$ ($\epsilon$ 16,000), $\nu_{max}^{KBr}$ 3500 (s), 3400 (s), 1750 (s), 1725 (s), 1630 (vs), 1235 (s) cm.$^{-1}$ identical with an authentic specimen (mixed M.P., I.R. spectrum), [M.P. 216–218.5°, $[\alpha]_D^{23}$ +156° (c. 0.36), $\lambda_{max}^{alc.}$ 241 m$\mu$ ($\epsilon$ 16,700)]

Chromatography of the concentrated mother liquor over alumina (eluting with methylene dichloride containing 0.5% methanol) gave a second crop (6 mg.) M.P. 202–205°. The total yield was 393 mg. (78%).

EXAMPLE 10

Debromination of 9$\alpha$-bromoprednisolone 21-acetate (a) Prednisolone 21-acetate (10 g.) was heated for 1½ hrs. on a steam-bath with freshly distilled DMF (Dimethylformamide) (80 ml.), dry pyridine (10 ml.) and methane sulphonyl chloride (6.6 ml.). The cooled reaction mixture was poured into dilute sodium bicarbonate solution and the product (7 g.) was filtered off. Chromatography of the same on silica gel (210 g.) in methylene dichloride and elution with methylene dichloride containing increasing proportion of methanol gave $\Delta^{1,4,9(11)}$-pregnatriene-17$\alpha$,21-diol - 3,20 - dione-21 acetate (4.37 g., 46%), M.P. 210–221°, $[\alpha]_D^{23}$ +50.7° (c. 1.3), $\lambda_{max}$ 238 m$\mu$ ($\epsilon$ 15,100), $\lambda_{max}^{nujol}$ 3500 (m), 1750 (s), 1725 (s), 1660 (vs), 1620 (s), 1605 (w), 1240 (s) cm.$^{-1}$.

The above compound (2 g.) in purified dioxane (200 ml.) containing 0.5 N aqueous perchloric acid (20 ml.) and water (10 ml.) was treated with N-bromoacetamide (1 g.). After an hour of stirring, it was treated with dilute aqueous sodium sulphite solution and extracted thoroughly with methylene dichloride. The extract was washed with dilute sodium bicarbonate solution, water, dried and evaporated in vacuo. Recrystallization from acetone gave the 9,11-bromohydrin as prisms (1.6 g.), M.P.183–189° dec., $[\alpha]_D^{24}$ +142° (c. 1.06 in dioxane), $\lambda_{max}$ 242 m$\mu$ ($\epsilon$ 13,830).

$\lambda_{max}^{nujol}$ 3510 (m), 3400 (m), 1740 (m), 1720 (s), 1665 (vs), 1620 (m), 1605 (w).

(b) Prednisolone 21-acetate

The above bromohydrin (600 mg.) in DMS (35 ml.) containing 1-butyl mercaptan (1 ml., ca. 7.5 mole equivs.) was treated with chromous acetate (74%, 1.4 g. ca., 5 mole equivs.) according to the general procedure. Recrystallisation of the product from methylene dichloridehexane gave prednisolone 21-acetate (350 mg.), M.P. 210–220°, $[\alpha]_D^{23}$ +111° (c. 0.72 in dioxane), $\lambda_{max}$ 242 m$\mu$ ($\epsilon$ 14,550), $\nu_{max}^{nujol}$ 3500 and 3400 (unresolved), 1755 (s), 1725 (s), 1650 (vs), 1590 (vs) cm.$^{-1}$.

identical with an authentic specimen; [M.P. 237–239° dec., $[\alpha]_D^{25}$ 116° (dioxane), $\lambda_{max}$ 242 m$\mu$ ($\epsilon$ 15,000)]. A second crop (20 mg.) M.P. 217–222° was obtained from the mother liquor. Net yield was 74%.

Similar reduction using methane thiol (3 ml., ca. 43 mole equivs.) afforded prednisolone acetate (380 mg., 76%), M.P. 212–220°, $[\alpha]_D^{20}$ +111° ($\alpha$ 0.66 in dioxane).

EXAMPLE 11

Chromous acetate reduction of 9$\alpha$-bromo-11$\beta$-hydroxy progesterone in DMS containing (a) 1,4 cyclohexadiene.—The bromohydrin (500 mg.) in DMS (30 ml.) containing 1,4-cyclohexadiene (2 g., ca. 20 mole equivs.) was treated with chromous acetate (70%, 1.4 g., ca. 5 mole equiv.) according to the general procedure. Chromatography of the reaction product over alumina (20 g.) and elution with methylene dichloride containing increasing proportions of methanol (0.40%) gave 11$\beta$-hydroxy progesterone (268 mg., 66%), M.P. 180–185°, identical with an authentic specimen (M.P. and I.R. spectrum).

(b) Triphenylsilane.—The bromohydrin (500 mg.) in DMS (35 ml.) containing triphenylsilane (1.5 g., ca. 5 mole equivs.) was treated with chromous acetate (70%, 1.4 g.) as before. Chromatography of the crude product (ca. 1.7 g.) over alumina (40 g.) and elution with methylene dichloride containing increasing proportions of methanol gave the following fractions:

(1) mostly triphenylsilane 1.14 g., M.P. 44–45°, $\nu_{max}^{nujol}$ 2140 (vs), 1590 (w), 1425 (vs), 1110 (vs) cm.$^{-1}$.

(2) 11$\beta$-hydroxy progesterone (163 mg., 40%), M.P. 165–180°.

(3) 11$\beta$-hydroxy 5,9-cyclo pregnane-3,20-dione (97 mg., 24%), M.P. 130–143°.

(c) Triphenyltin hydride.—Triphenyltin hydride was prepared by reduction of triphenyltin chloride with lithium aluminum hydride.

The bromohydrin (500 mg.) in DMS (35 ml.) containing triphenyltin hydride (3.2 g., 7.5 mole equivs.) was treated with chromous acetate (70%, 1.4 g.). The crude product was allowed to stand with methylene dichloride (ca. 10 ml.). Hexaphenylditin (ca. 1 g.) M.P. 237–240° was filtered off. Chromatography of the filtrate over alumina (35 g.) afforded the following major fractions:

(1) a mixture of hexaphenylditin and perhaps triphenyltin bromide (1.45 g.) M.P. 95–215°.

(2) A mixture of 11$\beta$-hydroxy progesterone and trace of organo tin compound (eluted with 0.5% methanol) ca. 300 mg.

The latter on rechromatography and crystallization from ethyl acetate gave 11$\beta$-hydroxy progesterone (261 mg., 65%) M.P. 182–188°.

EXAMPLE 12

3$\beta$-acetoxy-6$\beta$-hydroxy-androstan-17-one

A solution of 522 mg. of 3$\beta$-acetoxy-5$\alpha$-bromo-6$\beta$-hydroxy-androstan-17-one in DMS (35 ml.) and n-butyl mercaptan (1.5 ml., 11 mole equivs.) was treated with chromous acetate (73%, 1.4 g., 5 mole equivs.) according to the general procedure. Chromatography of the crude product over acid-washed alumina (20 g.) in methylene dichloride afforded the debromo steroid as prisms (277 mg., 65%), M.P. 165–182°. For analysis it was recrystallized from ethyl acetate: hexagonal prisms, M.P. 183–184°, $[\alpha]_D^{25}$ +40.9° (c. 1.07), $\gamma_{max}^{KBr}$ 3600 (s), 3000 (s), 2900 (s), 1750–1725 (vs), 1240 (vs) cm.$^{-1}$.

*Analysis.*—Calcd. for $C_{21}H_{22}O_4$: C, 72.36; H. 72.36; H, 9.29; O, 18.37. Found: C, 72.72; H, 9.17; O, 18.33.

EXAMPLE 13

11β-fluoro-Δ$^4$-pregnene-17α,21-diol-3,20-dione-21-acetate

9α-bromo - 11β - fluoro-Δ$^4$-pregnene-17α, 21-diol-3,20-dione-21-acetate (600 mg.) in DMS (50 ml.) containing n-butyl mercaptan (2 ml., 14.8 mole equivs.) was treated with chromous acetate (70%, 1.4 g.) according to the general method. After working up in the usual way, a crystalline residue (ca. 500 mg.) M.P. 185–193° was obtained. This did not contain any bromine (Beilstein). A thin-layer chromatogram (19:1 methylene dichloride-methanol mobile phase) showed essentially one component ($R_f$ 0.57). Recrystallization from ethyl acetate gave prisms (474 mg., 94%), M.P. 196–204°. The analytical sample had M.P. 204–206°, $[\alpha]_D^{24}$ +142.8° (c. 0.57), $\lambda_{max}$ 240 mμ (ε 15,360), $\gamma_{max}^{KBr}$ 3300 (broad), 1750 (s), 1725 (s), 1665 (s), 1620, 1240 (s) cm.$^{-1}$.

*Analysis.*—Calcd. for $C_{23}H_{31}O_5F$: C, 67.95; H, 7.69; F, 4.68. Found: C, 67.09; H, 7.56; F. 4.95.

In a control experiment the bromo fluoride (100 mg.) in dimethyl sulfoxide (9 ml.) was treated with chromous acetate (300 mg.) as in the above experiment. The homogeneous product (thin layer chromatography), crystallized from methylene dichloride-methanol, gave only 9(11)-anhydrocortisol acetate.

Chromatography of the concentrated mother liquor/over alumina (4 g.) in methylene dichloride containing 0.6% methanol and recrystallization from ethylene acetate-hexane gave prisms (10 mg.) M.P. 190–197°, $_{max.}^{nujol}$ 3510 (m), 1730 (m), 1705 (s), 1675 (s), 1620 (w) cm.$^{-1}$ Its infra-red spectrum differed from that of the main product.

EXAMPLE 14

(a) 9α-bromo-pregna-1,4-dien-11β-ol-3,20-dione

Pregna-1,4,9(11)-triene-3,20-dione (24.5 g.) in purified dioxane (1,600 ml.) containing 1 N aqueous perchloric acid (164 ml.) and water (328 ml.) was treated with N-bromoacetamide (16.4 g.). After 3 hrs. of stirring at room temperature, it was treated with dilute aqueous sodium sulphite solution and extracted thoroughly with methylene chloride. The extract was washed with dilute sodium bicarbonate solution, water, dried and evaporated in vacuo. Trituration of the crude residue with ethyl acetate gave the required bromohydrin as prisms, (25 g., 78.5%), M.P. 164–167° (dec.), $\nu_{max.}^{KBr}$ 3500 (m, br), 1710 (s), 1665 (vs), 1625, 1615 (s, unsplit) cm.$^{-1}$ The analysis indicated the content of the corresponding 9(11) olefin to be less than 5%. On recrystallisation from methanol this had M.P. 177–178° (dec.).

*Analysis.*—Calcd. for $C_{12}H_{27}O_3Br$: C, 61.80; H, 6.68; O, 11.79; Br, 19.62. Found: C, 61.71; H, 6.94; O, 11.90; Br. 19.82.

(b) Pregna-1,4-dien-11β-ol-3,20-dione

The bromohydrin from (a) (8.83 g.) in dimethyl sulphoxide (340 ml., redistilled) containing 1-butane thiol (18.5 ml., 7.9 mole equivalents) was treated with stirring with chromous acetate (12. g., 75% purity as determined by titration, about 2.44 mole equivs.) under carbon dioxide atmosphere for 17 hrs. (for convenience). The reaction product was diluted with water and extracted with methylene chloride. The crystalline precipitate obtained on concentration of the solvent was filtered off to give the desired debrominated steroid (3.82 g.), M.P. 228–233°, $\nu_{max.}^{KBr}$ 3650, 3500 (s, doublet), 1700 (s), 1665 (vs), 1620 (s) and 1610 (w, sh) cm.$^{-1}$ The filtrate was concentrated and chromatographed on acid-washed alumina (100 g.). Elution with methylene chloride containing increasing amounts of methanol gave (i) crude dibutyl disulphide ca. 2.4 g., which on distillation furnished an oil (2.05 g.), B.P. 130–135°/ca. 22 m., $n^{24.5}$ 1.4882 (identical with an authentic specimen, $n^{25}$ 1.4905 by T.L.C. and I.R.).

(ii) The desired debromosteroid (1.87 g.) M.P. 230–233°. Total yield was 5.69 g. (80%). This was identical with a specimen obtained by dehydrogenation of 11β-hydroxyprogesterone. The analytical specimen (methanol) had M.P. 242–243°.

*Analysis.*—Calcd. for $C_{21}H_{28}O_3$: C, 76.79; H, 8.59; O, 14.62. Found: C, 76.72; H, 8.57; O, 14.83.

EXAMPLE 15

11β-fluoropregna-1,4-diene-17α,21-diol-3,20-dione-21-acetate by chromous acetate reduction A dimethyl sulphoxide solution (10 ml.) of 9α-bromo-11β-fluoropregna-1,4-diene-17α,21-diol-3,20-dione-21 acetate (200 mg.) was deoxygenated by stirring at room temperature for one hour under a stream of carbon dioxide. n-Butylthiol (0.5 ml.) and chromous acetate (750 mg.) were added. The system was then stoppered and stirred overnight. After twenty hours the deep-red mixture was poured into twenty volumes of water containing saturated aqueous sodium chloride solution (20 ml.) whereupon the colour became green. (Simple exposure to air also causes the reaction mixture to become green). The aqueous mixture was extracted with methylene chloride which in turn was washed with water (five times). Upon filtration and evaporation of solvent at reduced pressure, a residue (225 mg.) was obtained which showed only one ultraviolet light absorbing spot ($R_f$=0.5) when chromatographed on a thin layer silica gel plate impregnated with fluorescein using 5% methanol in methylene dichloride. Chromatography on acid-washed alumina (10 g.) provided a polar fraction (128 mg.) of unclean semi-solid material when eluted with 0.5% methanol in methylene chloride. Recrystallisation from acetone/cyclohexane gave 53 mg. (32%) of clean crystals (M.P. 195–206°) which gave a negative Beilstein reaction. On combining with identical material from several other runs and recrystallizing from acetone/cyclohexane to constant melting point (206–209°), a pure sample was obtained for analysis.

*Analysis.*—Calculated for $C_{23}H_{29}O_5F$: C, 68.32; H, 7.18; F, 4.70. Found: C, 68.40; H, 7.42; F, 4.07.

The analytical physical constants were M.P. 206–209° $[\alpha]_D^{24}$=+103°, $\lambda_{max}$(KBr) 1610, 1630, 1660, 1710, 1740 cm.$^{-1}$; $\lambda_{max}$(MeOH)=241 mμ (14.500).

EXAMPLE 16

Treatment of 9α-bromo-11β-hydroxyprogesterone with chromous acetate and hypophosphorous acid in dimethylsulphoxide A dimethylsulphoxide solution (10 ml.) of bromohydrin (285 mg.) and hypophosphorous acid (0.5 ml. 50% aqueous) was deoxygenated by stirring under a stream of carbon dioxide for one hour. Addition of chromous acetate (0.80 g.) caused an immediate green coloration throughout. Within an hour the reaction mixture had become purple. The flask was stoppered and stirring was continued overnight. The contents were poured into water (250 ml.) containing saturated sodium chloride solution (25 ml.), which was then extracted with methylene chloride. The methylene chloride was washed with water (five times), filtered and evaporated. The residue on treatment with ethyl acetate provided crystalline material (200 mg., 87%, M.P. 175–187°) which had an infrared spectrum (KBr) identical to 11β-hydroxyprogesterone. Recrystallization from ethyl acetate gave a pure sample (M.P. 185–189°).

the melting point of which was not depressed by admixture with the authentic compound.

EXAMPLE 17

(a) Bromofluorination of 16α-methyl-pregna-1,4,9(11)-triene-17α,21-diol-3,20-dione-21-carbethoxylate Anhydrous hydrogen fluoride (33 g.) was distilled into a polyethylene flask (in a Dry Ice-acetone bath) containing tetrahydrofuran (50 ml., unpurified). The title steroid (2.300 g., 5.3 mmol.) and N-bromoacetamide (835 mg., 6.0 mmol.) in separate tetrahydrofuran solutions were cautiously poured into the reaction flask. The solution was stirred magnetically for one hour in the Dry Ice bath and for two hours in an ice water bath. It was then slowly and carefully poured into an iced sodium carbonate solution (2 litres, 10%) with stirring. The mixture was extracted with methylene chloride. The organic solution was washed with water, filtered and evaporated at reduced pressure. The residue was crystallized from acetone/cyclohexane. The yield was 2.325 g. (83%), M.P. 195–199° dec. Recrystallization of a small portion to constant melting point (205–206° dec.) provided a pure sample (solvated). It was heated to constant weight at 100° under vacuum. $[\alpha]_D^{28}$ +104°; $\lambda_{max}$ (KBr) 1610, 1625, 1665, 1730, 1750, 3000, 3700 cm.$^{-1}$ $\lambda_{max}$ (MeOH) 240 mµ (13,000).

*Analysis.*—Calcd. for $C_{25}H_{32}O_6BrF$: C, 56.92; H, 6.07; Br, 15.19; F, 3.61. Found: C, 57.00; H, 5.99; Br, 14.88; F, 3.59.

(b) Reductive debromination of 9α-bromo-11β-fluoro-16α-methyl-pregna - 1,4 - diene-17α,21-diol-3,20-dione-21-carbethoxylate The title steroid (1.910 g.) was dissolved in dimethylsulphoxide (35 ml.) and the solution was deoxygenated by bubbling in a brisk stream of carbon dioxide while stirring magnetically. After one hour, n-butylthiol (5.0 ml.) and chromous acetate (4.6 g.) were added. The carbon dioxide bubbler was removed and the flask was stoppered and stirred overnight. The purple solution was poured into a dilute (0.1 saturated) aqueous sodium chloride solution (500 ml.). The steroid was extracted with methylene chloride and washed well (five times) with water. The residue obtained on evaporation of the organic solvent was chromatographed on acid washed alumina (50 g.). The eluants were benzene, methylene chloride, then 0.4% methanol (in methylene chloride). This last eluted 1.4 g. of steroid in three fractions which appeared only slightly impure on examination by thin layer chromatography. Crystallization from methanol provided 750 mg. (46%) of material, M.P. 178–181°. The use of acetone/cyclohexane gave less material and of inferior quality. It was recrystallized from methanol to constant melting point 176–178°. $[\alpha]_D^{28}$ +80°; $\lambda_{max}$ (MeOH) 242 mµ (14,700); $\lambda_{max}$ (KBr) 1600, 1620, 1660, 1730, 1765, 3000, 3500 cm.$^{-1}$.

*Analysis.*—Calcd. for $C_{25}H_{33}O_6F$: C, 66.96; H, 7.37; F, 4.24. Found: C, 66.76; H, 7.32; F, 3.97.

EXAMPLE 18

The use of 1-benzyl-1,4-dihydronicotinamide as hydrogen donor in standard reductive debromination A deoxygenated dimethylsulphoxide solution (10 ml.) of 9α-bromo-11β-hydroxyprogesterone (250 mg.) was treated with benzyl dihydronicotinamide (prepared according to D.Mauzerall and F. H. Westheimer, JACS 77, 2261 (1955)) (340 mg.) and chromous acetate (750 mg.), and was stirred overnight in an atmosphere of carbon dioxide. After standing for an additional twenty four hours it was poured into a dilute (0.1 saturated) aqueous solution of sodium chloride (250 ml.). The organic material was extracted with methylene chloride which in turn was washed with water, hydrochloric acid (1 N) and three more portions of water. Solvents were stripped at reduced pressure. The residue (225 mg.) on examination by T.L.C. showed a major and a minor component at the proper polarity ($R_f$ 0.3 with 3% methanol in methylene chloride). Chromatography on acid washed alumina (11 g.) provided a polar fraction (165 mg. eluted by 0.5% methanol in methylene chloride) which was crystallized from ethyl acetate to yield pure 11β-hydroxyprogesterone (135 mg., 67%, M.P. 188–192°). The infrared spectrum (KBr) was identical to an authentic sample.

EXAMPLE 19

The reductive debromination of 5α-bromocholestan-3β,6β-diol-3-acetate

Dimethylsulphoxide (25 ml.) was deoxygenated by bubbling carbon dioxide for one hour. Chromous acetate (0.78 g.), n-butyl thiol (1.0 ml.), and the title steroid (275 mg.) were added. The flask was stoppered and stirred for three days.

The usual workup was followed by chromatography on acid washed alumina and recrystallization from cyclohexane to yield 155 mg. (67%) of 6β-hydroxycholesterylacetate, M.P. 162–165°, which had an infrared spectrum (KBr) identical to an authentic sample.

EXAMPLE 20

Reductive debromination of 9α-bromo-11β-hydroxypregn-4-en-3,20-dione 11-formate

The title steroid (450 mg.), dimethylsulfoxide (25 cc.), 1,4-cyclohexadiene (2 cc.), and chromous acetate (1.0 g.) gave 11β-hydroxyprogesterone 11-formate, M.P. 155–60°, lit. 157–61°. A sample of this material, after 3 hrs. of treatment with sodium hydroxide (1%) in refluxing methanol, gave 11β-hydroxyprogesterone. In the absence of cyclohexadiene, the chief product was $\Delta^{9,11}$-dehydroprogesterone.

EXAMPLE 21

Reductive debromination of 9α-bromo-11β-hydroxypregn-4-en-3,20-dione 11-trifluoracetate The title steroid (480 mg.), dimethylsulphoxide (25 cc.), 1,4-cyclohexadiene (2 cc.) and chromous acetate (1.0 g.) gave 11β-hydroxy progesterone 11-trifluoracetate. In the absence of cyclohexadiene, the product consisted almost entirely of $\Delta^{9,11}$-dehydroprogesterone.

EXAMPLE 22

Reductive debromination of 16β-bromopreg-5-en-3β, 17-diol-20-one 3-acetate

The title steroid (0.555 g.), dimethylsulfoxide (34 ml.), n-butanethiol (1 ml.), and chromous acetate (1.4 g.) gave a crude product (280 mg.), which on chromatography on acid-washed alumina afforded 3β,17α-dihydroxy-preg - 5 - en-20-one 3-acetate (162 mg., 35%).

EXAMPLE 23

Reductive debromination of 5α-bromo-3β,6β-dihydroxyandrostan-17-one 3-acetate

The title steroid (522 mg.), dimethylsulfoxide (35 ml.), n-butanethiol (1.5 ml.), and chromous acetate (1.4 g.), after chromatography on acid-washed alumina, gave 3β, 6β-dihydroxyandrostan-17-one 3-acetate (277 mg., 65%), M.P. 165–82° (analytical sample recrystallized from ethyl acetate had M.P. 183–5°, $[\alpha]_D^{25}$ +40.9°, $\gamma_{max}^{KBr}$ 3600 (s), 1750–1725 (vs), and 1240 (vs) cm.$^{-1}$)

*Analysis.*—Calcd. for $C_{21}H_{32}O_4$: C, 72.36; H, 9.29; O, 18.33. Found: C, 72.72; H, 9.17; O, 18.33.

I claim:

1. A process for the preparation of a debrominated analogue of a bromo-steroid of the pregnane, androstane or cholestane series which has a fluorine atom or a readily eliminatable monovalent oxygen function attached to a carbon atom adjacent to that to which the bromine atom is attached, comprising reacting said bromosteroid with a salt of a polyvalent metal in which the metal is in a lower state of valence capable of oxidation to a higher state in the presence of a substance capable of providing hydrogen free radicals, whereby said bromine atom is replaced by a hydrogen atom and attack on said substituent on said adjacent carbon atom is minimized.

2. A process as claimed in claim 1 in which said salt is a chromous salt of a lower carboxylic acid.

3. A process as claimed in claim 2 in which said acid is an alkanoic acid of from 1–6 carbon atoms.

4. A process as claimed in claim 1 in which said salt is chromous acetate.

5. A process as claimed in claim 1 in which said bromo-steroid has a bromine atom in one of the positions $5\alpha$-, $9\alpha$- and $16\beta$-.

6. A process as claimed in claim 1 in which the bromo-steroid possesses a hydroxy group attached to a carbon atom adjacent to that to which the bromine atom is attached.

7. A process as claimed in claim 1 in which the bromo-steroid possesses an acyloxy group attached to a carbon atom adjacent to that to which the bromine atom is attached.

8. A process as claimed in claim 7 in which said acyloxy group is a formyloxy group.

9. A process as claimed in claim 1 in which the bromo-steroid is a $9\alpha$-bromo-$11\beta$-fluoro-steroid.

10. A process as claimed in claim 1 in which said bromo-steroid is an $11\beta$-hydroxy-$\Delta^4$-3-keto-steroid having a bromine atom in the $9\alpha$-position.

11. A process as claimed in claim 1 in which said bromo-steroid is a $6\beta$-hydroxy steroid having a bromine atom in the $5\alpha$-position.

12. A process as claimed in claim 1 in which said substance capable of providing hydrogen free radicals is a member selected from the group consisting of a triaryl silane, a triaryltinhydride, 1,4-dihydrobenzene and 1-benzyl-1,4-dihydronicotinamide.

13. A process as claimed in claim 1 in which said substance capable of providing hydrogen free radicals is a thiol.

14. A process as claimed in claim 13 in which said thiol is a member selected from the group consisting of a lower alkyl thiol and thiophenol.

15. A process as claimed in claim 13 in which the thiol is n-butanethiol.

16. A process as claimed in claim 1 in which 1 to 10 mols of said substance capable of providing hydrogen free radicals are used with respect to said bromo-steroid.

17. A process as claimed in claim 1 in which the reaction is effected in an inert polar solvent.

18. A process as claimed in claim 17 in which said solvent is a member selected from the group consisting of an alcohol, ketone, cyclic ether, substituted amide and sulphone.

No references cited.

HENRY A. FRENCH, Primary Examiner

U.S. Cl. X.R.

260—397.2, 397.4, 397.45